May 12, 1931.  R. A. DOUDS  1,805,392
VALVE
Filed Nov. 27, 1929
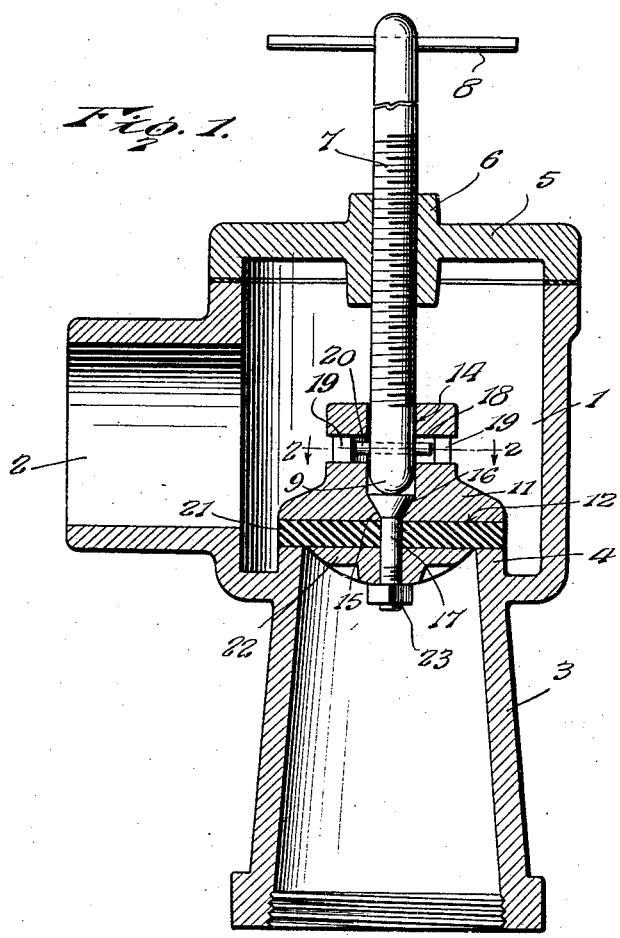
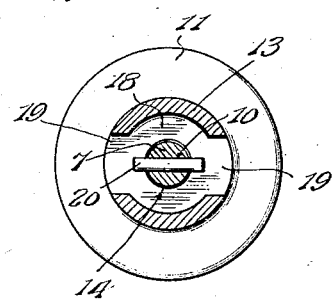
Inventor
R. A. Douds.
By Lacey & Lacey,
Attorneys Patented May 12, 1931

1,805,392

UNITED STATES PATENT OFFICE

RALPH A. DOUDS, OF LAKELAND, FLORIDA, ASSIGNOR TO WILLIAM PEACOCK AND ROBERT PEACOCK, BOTH OF LAKELAND, FLORIDA

VALVE

Application filed November 27, 1929. Serial No. 410,236.

This invention relates to valves and more particularly to a valve for use in connection with irrigating pipes. This valve is of the type disclosed in my copending application filed April 11, 1929, Serial No. 354,388, but is provided with a head specifically different in its construction.

One object of the invention is to provide the valve with a head adapted to be moved into and out of closing relation to the inlet of the valve casing by a threaded stem and to allow the stem to be rotated and exert pressure to tightly force the head against a valve seat about the inlet without the head being rotated with the stem and thereby reduce wear upon a sealing disk carried by the head.

Another object of the invention is to allow the head to be loosely mounted upon the inner end portion of the stem but at the same time prevent the head from moving transversely out of axial alinement with the stem and thereby cause the head to at all times retain its proper position relative to the stem and valve seat and move easily into a closed position.

Another object of the invention is to cause wear exerted by the inner end of the valve stem when tightened to come against one end of a bolt which holds a sealing disk and facing washer in place instead of against the valve head.

Another object of the invention is to provide the valve with a head which is of a very simple construction and not liable to easily get out of order.

The invention is illustrated in the accompanying drawings, wherein

Figure 1 is a vertical sectional view through the improved valve, and

Fig. 2 is a transverse sectional view through the valve head and stem taken on the line 2—2 of Figure 1.

This improved valve has its casing 1 formed with a discharge neck 2 and an inlet neck 3. The inlet neck 3 communicates with the interior of the casing through an opening formed in the bottom thereof and about this inlet opening is formed an upstanding valve seat 4 having a flat upper edge face. The open upper end of the casing is closed by a head or bonnet 5 which may be securely but releasably held in place in any manner desired and in its center the head is formed with a threaded bearing 6 through which passes a threaded valve stem 7. The stem may be of any length desired and adjacent its upper end is provided with a turning element 8 which may be a short rod passed through the stem, a wheel or any other desired type of handle. The inner end portion of the stem is unthreaded and terminates in a rounded end 9 and adjacent this inner end of the stem is formed an opening 10 which extends transversely through the stem.

In order to close the inlet, there has been provided a valve head 11 formed of metal and having a flat under face 12. A neck 13 extends upwardly, and in order to receive the lower end portion of the stem, there has been provided a passage or opening 14 which extends axially through the valve head and has its lower end tapered, as shown at 15, to form a seat to receive the head 16 of a bolt 17. The intermediate portion of the passage 14 is enlarged, as shown at 18, to form a chamber of greater diameter than the portions of the passage above and below it and at opposite sides of the neck are formed openings or passages 19 which communicate with the chamber 18. By providing the neck with opposed openings 19 a securing pin 20 of less length than the diameter of the chamber 18 may be easily passed through the opening 10 formed through the inner end portion of the stem or driven out of place when it is desired to release the valve head from the stem. It should be noted that the tapered end portion 15 of the passage 14 is spaced well below the chamber or enlarged intermediate portion 18 and, therefore, when the valve head is applied to the stem the lower portion of the stem which bears against the head of the bolt will extend below the chamber 18 and the valve head will be prevented from having rocking motion transversely upon the stem. At the same time the valve head will fit loosely upon the stem and the stem may be rotated in order to move the valve head toward a closed or opened position. When the valve stem is tightened, pressure exerted comes against the head of the bolt instead of against a portion of the valve head and when the stem causes the portion against which it bears to be worn it is merely necessary to provide a new bolt instead of an entire valve head. A sealing washer 21 formed of rubber or any suitable composition fits against the under face of the valve head and after the sealing disk has been applied a facing disk 22 formed of metal is set in place against the under face of the sealing disk. Alined openings are formed centrally through the sealing disk and facing disk to receive the bolt 17 and a nut 23 is employed to engage the facing disk and firmly hold this disk and the sealing disk in place. The facing disk is of less diameter than the sealing disk, and by an inspection of Figure 1 it will be seen that this facing disk fits into the inlet when the marginal portions of the sealing disk are seated against the upper marginal edge of the valve seat 4. By having the lower end of the valve stem extend below the chamber 18 the valve head will at all times be retained in axial alinement with the stem and inlet and, therefore, when the stem is rotated to open the valve and the valve head is moved upwardly by the pulling action of the stem and the pressure of water passing inwardly through the inlet there will be no danger of the valve head being tilted transversely of the stem and prevented from seating properly against the valve seat when the valve is again closed.

Having thus described the invention, I claim:

1. In a valve structure, a threaded stem having a transverse opening adjacent its inner end, a head formed with an axially extending passage enlarged intermediate its ends to form a chamber and at opposite sides of the chamber formed with openings communicating with the chamber, a sealing disk against said head, a fastener inserted through the end of said passage on one side of said chamber and passed through said disk, said fastener having a head seated in said passage in spaced relation to said chamber, a stem rotatably received in said passage and extending past the chamber and bearing against the head of said fastener, and a pin inserted through a side opening of the chamber and passed through the transverse opening of said stem.

2. In a valve structure, a head formed with an axially extending passage enlarged intermediate its ends to form a chamber, a sealing disk against said head, a fastener inserted through the end of said passage on one side of said chamber and passed outwardly through said disk and at its inner end having a head seated in the passage in spaced relation to said chamber, a stem loosely received in said passage and extending past said chamber and bearing against the head of said fastener, and means to retain the valve head upon said stem carried by the stem and housed in said chamber.

3. In a valve structure, a threaded stem having a transverse opening adjacent its inner end, a head formed with an axially extending passage tapered at one end to form a seat and having its intermediate portion enlarged, said head being also formed with a transverse passage intersecting the enlarged intermediate portion of the axially extending passage, a sealing disk fitting against said head, a facing disk fitting against said sealing disk with marginal portions of the sealing disk projecting therefrom, a fastener inserted through the tapered end of the axially extending passage of said head and passed through said sealing disk and facing disk and having a head seated in the tapered end of said axially extending passage, said stem extending into the axially extending passage and bearing against the head of said fastener, and a securing pin inserted through the transverse passage and passed through the opening in said stem and adapted to turn freely in the enlarged portion of the axially extending passage when the stem is rotated.

4. In a valve structure, a casing provided with an outlet and having its bottom formed with an inlet, an upstanding valve seat surrounding said inlet, a threaded stem extending into said casing axially of said inlet, a head formed with a vertically extending passage having a tapered lower portion and an enlarged intermediate portion, said head also having a transversely extending passage intersecting the intermediate portion of the vertical passage, a sealing disk fitting against the under face of said head, a facing disk fitting against said sealing disk, a fastener passed through the tapered lower portion of the vertical passage and through the sealing disk and facing disk and having a head at its upper end seated in the tapered lower portion of the vertical passage in spaced relation to the enlarged intermediate portion thereof, said stem having its lower end portion rotatably received in said vertical passage and bearing against the head of said fastener, and a securing pin inserted through said transverse passage and passed diametrically through said stem and adapted to turn in the enlarged intermediate portion of the vertical passage when the stem is rotated.

In testimony whereof I affix my signature.

RALPH A. DOUDS. [L. S.]